US008719793B2

(12) United States Patent
Maeda et al.

(10) Patent No.: US 8,719,793 B2
(45) Date of Patent: May 6, 2014

(54) SCOPE BOUNDING WITH AUTOMATED SPECIFICATION INFERENCE FOR SCALABLE SOFTWARE MODEL CHECKING

(75) Inventors: Naoto Maeda, Tokyo (JP); Franjo Ivancic, Princeton, NJ (US); Sriram Sankaranarayanan, Boulder, CO (US); Aarti Gupta, Princeton, NJ (US)

(73) Assignees: NEC Laboratories America, Inc., Princeton, NJ (US); NEC Corporation (JP)

( * ) Notice: Subject to any disclaimer, the term of this patent is extended or adjusted under 35 U.S.C. 154(b) by 245 days.

(21) Appl. No.: 13/314,738

(22) Filed: Dec. 8, 2011

(65) Prior Publication Data

US 2012/0151449 A1    Jun. 14, 2012

Related U.S. Application Data

(60) Provisional application No. 61/420,983, filed on Dec. 8, 2010.

(51) Int. Cl.
*G06F 9/45* (2006.01)
(52) U.S. Cl.
USPC ........... 717/126; 717/125; 717/127; 717/128; 717/129
(58) Field of Classification Search
None
See application file for complete search history.

(56) References Cited

U.S. PATENT DOCUMENTS

| | | | | |
|---|---|---|---|---|
| 5,500,881 A * | 3/1996 | Levin et al. | .................. | 717/141 |
| 5,940,619 A * | 8/1999 | Abadi et al. | .................. | 717/156 |
| 7,711,525 B2 * | 5/2010 | Ganai et al. | ....................... | 703/2 |
| 7,779,382 B2 * | 8/2010 | Rehof et al. | .................. | 717/104 |
| 7,853,906 B2 * | 12/2010 | Ganai et al. | .................. | 717/104 |
| 2003/0225552 A1 * | 12/2003 | Ganai et al. | ....................... | 703/2 |
| 2005/0066319 A1 * | 3/2005 | DeLine et al. | ............... | 717/141 |
| 2009/0328015 A1 * | 12/2009 | Bjorner et al. | ............... | 717/142 |
| 2010/0070955 A1 * | 3/2010 | Kahlon | ......................... | 717/141 |
| 2012/0151449 A1 * | 6/2012 | Maeda et al. | ................. | 717/126 |
| 2012/0233584 A1 * | 9/2012 | Ivancic et al. | ................. | 717/104 |

OTHER PUBLICATIONS

M.Taghdiri and D.Jackson, "Inferring Specification to Detect Errors in Code"; Automated Software Engineering, 14(1):87-121,2007.
Domagoj Babic and Alan J. Hu, "Structural Abstraction of Software Verification Conditions", Proceedings of International Conference on Computer Aided Verification (CAV) 2007: 366-378.

* cited by examiner

*Primary Examiner* — Isaac Tecklu
(74) *Attorney, Agent, or Firm* — Joseph Kolodka

(57) ABSTRACT

A scalable, computer implemented method for finding subtle flaws in software programs. The method advantageously employs 1) scope bounding which limits the size of a generated model by excluding deeply-nested function calls, where the scope bounding vector is chosen non-monotonically, and 2) automatic specification inference which generates constraints for functions through the effect of a light-weight and scalable global analysis. Advantageously, scalable software model checking is achieved while at the same time finding more bugs.

8 Claims, 6 Drawing Sheets

Function depthCutoff(entry, depth)
Map depthMap: Func $\mapsto$ Integer.
Insert assume ($\phi_{entry}$) at the start of entry.
for all functions f in callgraph do
  depthMap(f) := Length of the shortest path in
    call-graph from entry to f.
for all f such that depthMap(f) = depth do
  for all call-sites c in function f do
    let g be the function called at c
    if depthMap(g) > depth then
      Insert assert ($\phi_g$) before c.
      // Cut off function call c.
      Replace c with call to stub_g.

FIG. 1(a)

```
L1   err_code = config_description_doc( doc, ipaddr_port, &root_path );
L2   if( err_code != UPNP_E_SUCCESS ) { goto error_handler;}
L3   err_code = calc_alias( alias, root_path, &new_alias );
``` urlconfig.c:203-340

```
     int config_description_doc(IXML_Document * doc, const char *ip_str, char **root_path_str ){
     ...
L4   err_code = ixmlNode_appendChild( rootNode, ( IXML_Node * ) element );
L5   if( err_code != IXML_SUCCESS ) { goto error_handler;}
L6   textNode = ixmlDocument_createTextNode( doc, ( char * )url_str.buf );
L7   if( textNode == NULL ) { goto error_handler;}
     ... // *root_path_str is updated here.
     error_handler:
L8   if( err_code != UPNP_E_SUCCESS ) ( ( ixmlElement_free( newElement )););
     ...
L9   return err_code;}
```

FIG. 2

SCOPE BOUNDING WITH AUTOMATED SPECIFICATION INFERENCE FOR SCALABLE SOFTWARE MODEL CHECKING

CROSS REFERENCE TO RELATED APPLICATION

This application claims the benefit of U.S. Provisional Patent Application Ser. No. 61/420,983 filed Dec. 8, 2011 which is incorporated by reference in its entirety as if set forth at length herein.

TECHNICAL FIELD

This disclosure relates generally to the field of computer software and in particular to a method for scalable software model checking.

BACKGROUND

Model checking and static analysis are well-known techniques for finding subtle flaws in software systems. However, the lack of scalability and inaccuracies in the models employed leads to false positives and are therefore detriments to their more extensive use.

Accordingly, methods which permit the more effective application of model checking and model checkers to large software systems would represent a welcome addition to the art.

SUMMARY

An advance in the art is made according to an aspect of the present disclosure directed to a computer implemented verification method that advantageously exploits a particular software verification tool employed. Advantageously, the method of the instant disclosure permits the more effective application of software model checkers to large software systems.

Viewed from one exemplary aspect, the present disclosure is directed to a computer implemented verification method and underlying framework that provides a continuous or perpetual program analysis environment that analyzes a computer software program not once—as is common in the prior art—but continuously even after that computer software program is changed. In this advantageous manner, the continuous framework may analyze the computer software program on a fixed schedule, for example, daily, weekly, etc.

Viewed from another exemplary aspect, the present disclosure is directed to a method and framework which uses information gained from prior analysis to adaptively improve the current analysis—for example improving any bounds used in scope bounded analysis. Similarly, portions of the computer software program under analysis which have not been affected by changes do not require that their analysis be repeated.

Accordingly, and in sharp contrast to the prior art, methods according to an aspect of the present disclosure advantageously work for all properties within a statically-determined scope. More specifically, instead of expanding the scope iteratively, a method according to the present disclosure refines pre-conditions and stubs for cut-off functions, based on witness traces, non-monotonically.

Advantageously, such methods and framework improve the scalability, and precision while still permitting user input.

BRIEF DESCRIPTION OF THE DRAWING

A more complete understanding of the present disclosure may be realized by reference to the accompanying drawings in which:

FIG. 1(a) shows an example function call rewriting according to an aspect of the present disclosure;

FIG. 2 shows a program excerpt containing a subtle interprocedural bug;

DETAILED DESCRIPTION

Figure 1B:
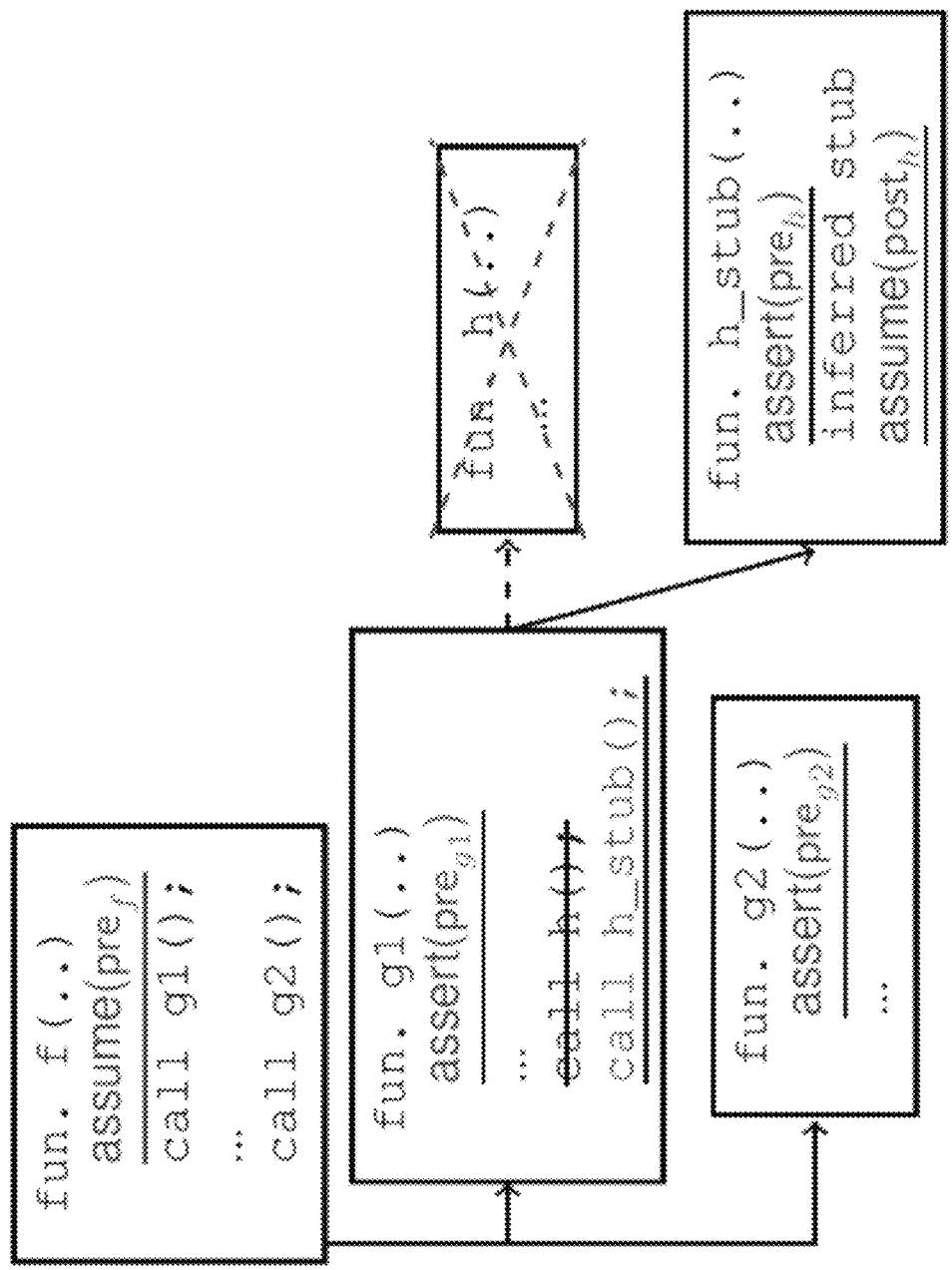
FIG. 1(b) is a schematic depicting a depth cutoff scheme on a call graph according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, software model checking is a well-known technique for finding subtle bugs in software programs. One particular utility of model checking and model checkers is their ability to present witnesses to help explain a bug to a developer. As is known by those skilled in the art, witnesses also allow the developer to quickly evaluate the validity of any bug reports and arrive at possible fixes. Notwithstanding these virtues however, their lack of scalability and susceptibility to false positives due to modeling abstractions deter their more widespread industrial adoption.

Accordingly, a practical software model checker must exhibit a number of characteristics including (1) Scalability: In our experience, the model checker should handle 1MLOC and beyond for C source code; (2) Performance: The model checker must complete the verification within the allotted time; and finally, (3) Accuracy: The model checker should exhibit a low rate of false warnings, so that human effort is not wasted.

Varvel is a software verification tool based on an earlier research prototype called F-Soft. Varvel uses a combination of abstract interpretation and model checking to find common errors in C/C++ programs including pointer usage errors, buffer overruns, C string errors, API usage violations as well as violation of user-defined assertions. At its core Varvel utilizes a bit-precise SAT-based bounded model checker (BMC) which translates the given program and properties to be verified into a series of SAT formulae.

These formulae are solved by a SAT solver to generate witnesses that correspond to property violations. Varvel has been engineered to handle low-level aspects of C programs including pointer arithmetic, dynamic memory allocation, function pointers, bitwise operations, structure and union types with field sensitivity, and multi-dimensional arrays.

The scalability of Varvel is obtained in part through the use of numerical domain abstract interpretation using domains such as octagons to statically prove properties. Once a property is initially proved using a static analyzer, it is advantageously removed from further consideration. Program slicing is used to remove large portions of a program that are irrelevant to the remaining properties, along with constant folding to simplify complex program expressions.

Abstract interpretation is staged from "simple" inexpensive analyses such as interval analysis to more expensive domains such as disjunctive octagons, with slicing and simplification used at the end of each stage to reduce program sizes. In practice, roughly 70-90% of the automatically instrumented properties in a program are rapidly eliminated from consideration using static analysis before the bounded model checker is deployed.

In spite of these optimizations in Varvel, it remains prohibitively hard to perform a whole program analysis for large programs. More particularly, Varvel treats every function appearing in a given program as a possible entry function for verification. Although this helps to verify some functions, challenges remain for entry functions with large call graphs where the models may become too large.

Notably, this can generate false witnesses. When an internal function is treated as an entry function for verification, the input parameters and global variables are assumed to hold arbitrary values. In reality, however, these parameters are constrained based on how the function is called in the program. As a result, false witnesses may be produced by assigning a value to an input that cannot be realized in an actual execution.

In this disclosure, we present a framework called DC2 (Depth Cut-off and Design Constraint generation) that forms part of the verification procedure used in Varvel. DC2 is a combination of scope bounding and automated specification inference techniques. Scope bounding refers to limiting the size of the generated model by excluding deeply-nested function calls. Automatic specification inference refers to the generation of constraints for functions by a light-weight and scalable global analysis. The aim of DC2 is to enable scalable software model checking and at the same time finding more bugs.

Scope Bounding

As may be readily appreciated, the state space of a program is often infinite due to recursion, heap-allocated data, loops, and so on. Consequently, bounded software model checkers artificially limit the size of structures that might be infinite. For instance, Varvel introduces the following bounds: the maximum size of heap to model, unrolling-depth for recursive calls, and time available for verification, etc. We call this set of bounds a scope bounding vector, each component of which can be changed independently. While the bounding may cause the model checker to miss bugs that occur beyond the bounds, it nevertheless helps the software model checker find useful bugs in practice.

DC2 introduces one additional bound into software model checking in a non-intrusive way. More particularly, in order to generate a model that is amenable to model checking, DC2 cuts off function calls beyond a user-specified depth, where depth is defined as the shortest path from the entry function. Cut-off is done by replacing a function call with a dummy-function call.

We note that in our exemplary framework according to an aspect of the present disclosure, the inference of pre/post conditions and stubs is supported by simple whole program analysis we call SpecTackle. The refinement process, we call CEGER, employs an analysis around a counterexample generated by a model checker and identified as a false alarm by the user.

The algorithm is described in FIG. 1(a). $\phi^{entry}$ and $\phi_g$ are the constraints and stub_g is the stub inferred. Instrumentation is performed as a preprocessing step that is independent of the verification itself. The depth cutoff scheme is illustrated in FIG. 1(b).

Note that the entry function of the analysis, the precondition inferred by SpecTackle, is assumed, whereas it is asserted for other called functions. The function h is deemed outside the scope. Therefore, a stub replacement—h_stub—is automatically created and the inferred preconditions, post-conditions, and stubs are used in place of h.

Advantageously, the instrumentation does not affect the soundness of static analysis. When the static analyzer encounters a call to a function whose definition is not available (or has been cut off), it uses a conservative update to model the side-effects of the function.

To be useful in practice however, the abstract interpreter in Varvel performs a conservative update only for the actual parameters of undefined functions. For every actual parameter v, it assigns the abstract value $\top$ (which refers to a non-deterministic concrete value) to v·γ, where γ is the set of access paths that consist of field and array indices. Because the maximum number of static or dynamic array elements to model and the maximum number of recursive field accesses are bounded, the length of access paths and the number of access paths are also bounded.

Automated Specification Inference

Scope bounding largely alleviates the issue of scalability and often provides enough local context within the bounded scope to find useful bugs. However, just cutting off deep function calls is not sufficient, since it can adversely impact accuracy. For instance, inputs for internal functions are still not constrained. In addition, the over-approximated side effects of cut-off functions may cause more false bugs. Further, we may miss bugs that occur outside the scope.

To cope with these issues, DC2 utilizes a light-weight global analysis called SpecTackle. SpecTackle has two roles: (1) to generate preconditions for functions, and (2) to generate stubs which captures important side-effects of functions. Both these are tailored specifically to the checkers in Varvel.

Preconditions

SpecTackle visits functions in a reverse topological order with respect to the call graph of the program. For each function, it hoists conditions within the body to the start of the function, by back propagating the conditions across the statements. Hoisted conditions are used for two purposes: (1) to constrain the inputs of an internal function f when it is an entry function for verification, and (2) to assert the correctness of inputs to a called function g.

Note, in particular, that the assertion check assert ($\phi_g$) will trigger a violation during model checking and generate a witness in case the hoisted condition g is not correct. In other words, we do not require SpecTackle to generate correct preconditions. In practice, we try to automatically generate likely preconditions. The generated witnesses by Varvel can be additionally used for manual refinement of the preconditions, if desired.

Here, we briefly describe the kinds of preconditions that SpecTackle generates for a given function.

Pointer Validity:

For every pointer p that is dereferenced without checking for nullness, SpecTackle back propagates the condition (p != NULL) to the beginning of the function. If the resulting condition involves a formal parameter or a global variable, it will be retained as a precondition for the function.

Array Bound:

For every variable i that is used as an index expression for accessing a static array of size n, it back-propagates the condition (0<i<n) to the start of the function. If the resulting condition depends only on the inputs to the function, it will be used as a precondition that constrains the range of the respective inputs.

Allocated Heap Size:

If a dereferenced expression is an input variable itself or is aliased with an input, SpecTackle tries to capture the constraints on the size of heap area pointed-to by the expression by analyzing pointer arithmetic operations. For example, consider the following function:

void f(T*t1,int k)
{T*t2; t2=t1+k; *t2=7;}

From the expression *t2 and the pointer arithmetic operation t2=t1+k, SpecTackle generates the following precondition for f:_heap_size (t1)>k.

Field Relation Inference:

SpecTackle captures specific patterns of field usage. For instance, we often see struct definitions that have two fields, one pointing to the heap and the other indicating the length of the heap as below:

struct S {char*buf; size_t len;} st;

SpecTackle automatically extracts such relations and globally constrains the type of inputs.

Assertion Hoisting:

SpecTackle hoists user-defined assertions (written with assert) to the beginning of functions. Moreover, Varvel allows users to write preconditions. Those manually written preconditions are also hoisted by SpecTackle. SpecTackle is designed to be fast and scalable even for large software. Therefore, we avoid computing weakest preconditions since it is typically too costly for the whole program. Although a bug may be missed due to an incorrect assumption that was never caught at the higher level (when checked as an assertion), we have found this not to be a problem in practice.

Hoisting of Annotations

We refer to assertions (user-defined, or automatically instrumented by various checkers) and preconditions as annotations—these are hoisted by SpecTackle. SpecTackle is advantageously designed to be fast and scalable even for large software systems. Therefore, we avoid computing weakest preconditions since it is typically expensive for the whole program. This section briefly discusses how annotations are hoisted to the beginning of functions and across calls in the call graph, by using purely syntactic domain operations.

Let $\phi_l$ be a precondition annotation generated at a program point/inside a function $f$. Our goal is to compute an appropriate precondition $\psi$ corresponding to the entry point of function $f$. To hoist an annotation $\phi_l$ at location l, SpecTackle initalizes l with $\phi_l$ and every other location with the condition false. $\psi$ is computed by means of a backwards data-flow analysis that captures the effect of various assignments and conditional branches between program point l and the entry point of f.

Preconditions across assignment statements are treated by substitution of the right-hand side in place of the LHS expression. The pre operator is also defined to propagate a constraint $\phi$ backwards across a branch condition c. Computing this operation involves the syntactic search for a conjunct in $\phi$ that contradicts the branch condition c. If such a conjunct is obtained, the precondition is set to false. If, on the other hand, $\phi$ contains a conjunct that is identical to c (syntactically), the result of the precondition is given by true. Failing this, the precondition is set to $\phi$, instead of the more general constraint $c \Rightarrow \phi$. This is done in part to keep the syntactic form of the preconditions simple so that the dataflow analysis can be performed efficiently. Formally, $$pre(\varphi, c) = \begin{cases} \text{false} & \text{if } \varphi \text{ "syntactically contradicts" } c \\ \text{true} & \text{if } \varphi \text{ "is identical to" } c \\ \varphi & \text{otherwise} \end{cases}$$

A join operator ($\square$) is used to merge two preconditions $\phi$ and $\psi$ obtained from the two parts of a branch. The join operator works by matching its operands syntactically. If one of the operand syntactically matches false, the result is taken to be the other operand. If $\psi$ can be obtained by conjoining some assertion $\psi'$ to $\phi$ then the join chooses the weaker assertion $\phi$. Finally, if the operands do not fall into any of the categories above, the result of the join is the trivial annotation true. Formally, $$\phi \square \psi = \begin{cases} \phi & \text{if } \psi \text{ is syntactically false} \\ \phi & \text{if } (\psi \equiv \phi \wedge \psi') \\ \psi & \text{if } \phi \text{ is syntactically false} \\ \psi & \text{if } (\phi \equiv \psi \wedge \phi') \\ \text{true} & \text{otherwise} \end{cases}$$

When the analysis converges, the assertion labeling the entry point of the function denotes the entry precondition $\psi$. If $\psi$ is an assertion other than true or false, it can be propagated to the callers of the function. If $\psi$=false, then a warning is issued to the user.

Example 1

Figure 4:
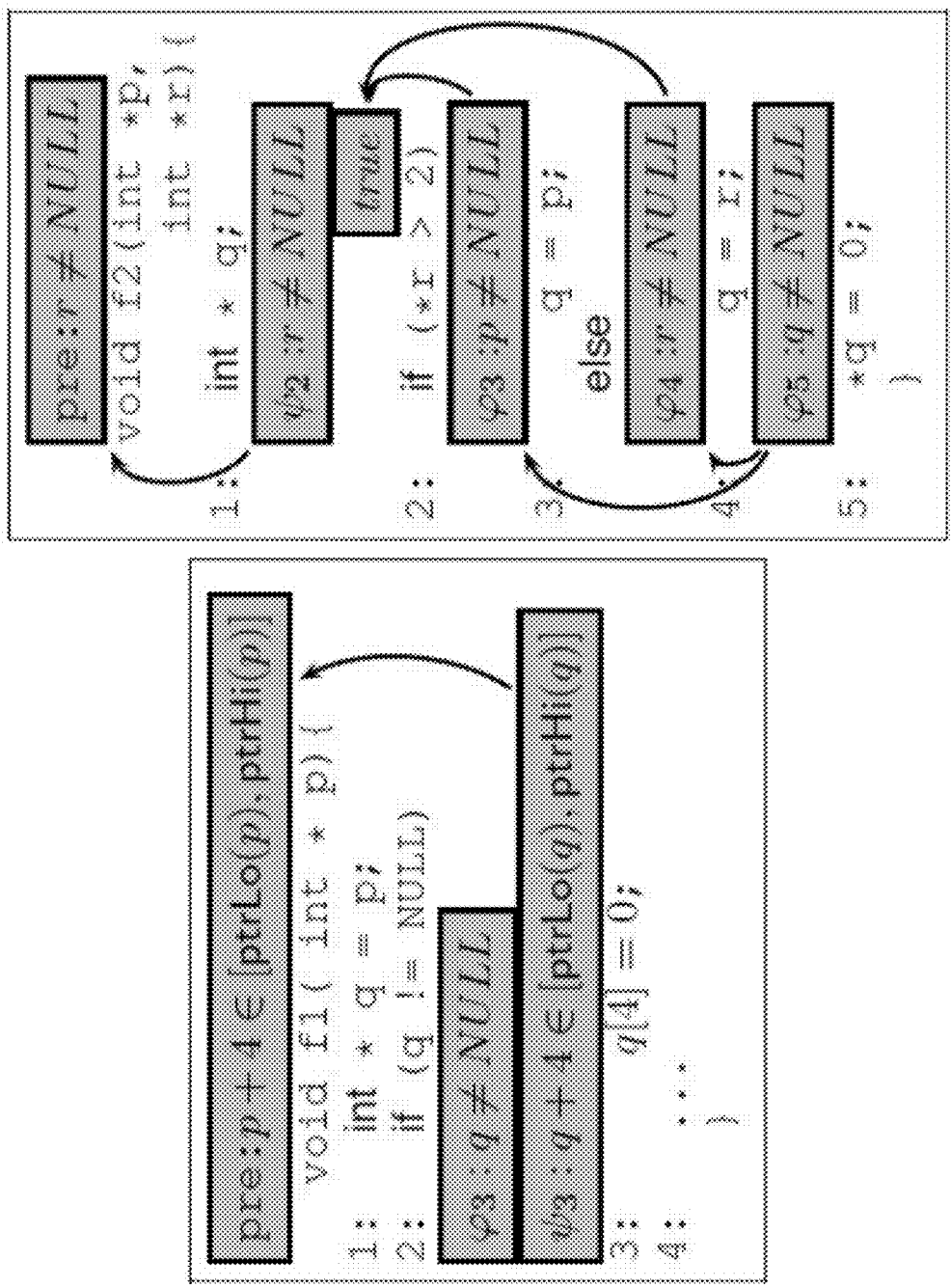
FIG. 4 shows a schematic depicting hoisting annotations across statements and branches.

Consider function f1 shown in FIG. 4-(a). The pointer dereference q[4] in line 3 of f1 gives rise to two annotations $\phi_3$ and $\psi_3$. The bound [ptrLo(p), ptrHi(p)] represents the range of legal values for pointer p, such that p may be dereferenced in our model without causing an out-of-bounds violation. That is, ptrLo(p) represents the base address of the memory region that contains p. In other words, accessing p with an index such that the resulting address is less than ptrLo(p) would cause a buffer underflow. Similarly, ptrHi(p) represents the largest address that is validly allowed to be dereferenced in the memory region of p.

In the example of FIG. 4-(a), consider the assertion $\phi_3$: q≠NULL. Because $\phi_3$ is identical to branch condition c: q != NULL at line 2, the precondition pre($\phi_3$,c) is true. Note that the assertion $\phi_4$ labelling line 4 is initially fase. Therefore, joining the contribution across the two branches at line 2, yields $\phi_2$: true. As a result, the annotation q≠NULL does not yield a precondition for f1.

On the other hand, hoisting the annotation $\psi_3$: q+4∈[ptrLo(q), ptrHi(q)] produces the precondition p+4∈[ptrLo(p), ptrHi(p)]. In a case like this, we generate the following precondition: if (p){p+4∈[ptrLo(p), ptrHi(p)]}.

Example 2

Consider function f2 shown in FIG. 4-(b). The pointer dereference *q at line 5 gives rise to the annotation $\phi_3$. Similarly, the pointer dereference *r at line 2 gives rise to the annotation $\psi_2$. Annotation $\phi_5$ can be hoisted across the assignments in lines 3 and 4 yielding $\phi_3$: p≠NULL and $\phi_4$: r≠NULL, respectively. The join operation at the branch in line 2 yields the assertion true. As a result, annotation $\phi_5$ does not contribute to the precondition for f2. On the other hand, when the annotation $\psi_2$ at line 2 is hoisted to the start of f2, we generate the preconditon r≠NULL for f2.

In practice, a sound and complete precondition is not strictly necessary. If the precondition is overly restrictive, it may lead to a violation at some call site. Similarly, if the precondition is overly relaxed, it may cause false alarms due to an under-specified environment. In practice, our implementation of SpecTackle sacrifices soundness in its handling of pointer indirections. Nevertheless, the number of unsound preconditions generated is very few in practice and such instances are advantageously detected through witnesses generated by the model checker.

Stub Generation

SpecTackle generate stubs to model the side-effects of cut-off functions using the following analyses:

Mod-Ref Analysis:

A conservative update to all variables accessible in a cut-off function may generate too many false bugs. Therefore, SpecTackle conducts a lightweight mod-ref (modification and reference) analysis to specify which variables may be modified by a function and generates a stub that updates only those variables that are modified within the function.

Key Effects Extraction:

Some function calls are important for verification. For instance, if a function calls free or exit internally, it will generate a stub that invokes these functions.

Perpetual Program Analysis Framework

Scope-bounded program analysis systematically analyzes a program using a variety of backend solving techniques, after its state-space has been bounded. The state-space is typically bounded using bounds in a number of different dimensions. Some prior work has proposed, for example, bounding input-size and length of execution paths. Other typical bounds relate to bounding the allowed heap space to be used by the code fragment under analysis, bounding the number of recursive iterations of a function call sequence, bounding the number of loops iterations, bounding the set of function calls to consider, etc. These fixed bounds may be iteratively relaxed in prior art to consider increasingly larger scenarios.

Most program analysis techniques however generally consider a one-time program analysis environment and also consider only the expansion of bounds in a monotonic way. A piece of software is analyzed by some tool T once, for example before code release. A human user interprets the results of the automated analysis performed by T and marks certain warnings as relevant warnings that need to be addressed, while others are discarded as false warnings. Such false warnings generally occur due to some limitation of the particular analysis used, or due to use of unconstrained inputs that model the effect of code outside the scope boundary. Accordingly, the present disclosure is concerned with a perpetual program analysis environment where tool T is used on a fixed-schedule basis for each piece of software, such as daily or weekly.

In such an environment we are interested in:
utilizing information gained from prior analysis runs to adaptively improve the bounds used in scope-bounded analysis, and
not repeating analyses for program segments that have not been affected by changes since the last run of T.

Adaptive scope-bounding can be used to create a sound analysis, to create a complete analysis, or, most commonly, to mix over- and under-approximate abstractions to discover bugs with low false positive rates. In general, larger scopes improve the precision of the analysis but significantly decrease the scalability.

In perpetual (continuous) program analysis, especially with a human user investigating warnings and classifying them as relevant or false, we have additional information to adapt the scope bounds dynamically over time to improve performance and precision, thereby affecting the number and accuracy of bugs reported by the analysis. For certain bound dimensions, we incorporate a taint-based self-limitation analysis that allows, for example, uninitialized parameters to a function that is beyond the bounded scope horizon to be assumed safely initialized after returning from such a function call. The taint of such parameters to a value representing assume-safe is propagated to others in a data- and control-dependent manner.

According to an aspect of the present disclosure, we use a database of prior runs. More particularly, for every analysis instance, we record the chosen scope bound parameters, we record the maximum time allotted for the analysis, as well as the analysis results.

Analysis results include statistics of the analysis, such as time taken to perform various stages of analysis, and the number of checks performed. The checks are categorized as (1) proved, (2) tainted as assume-safe, (3) warnings concretized as witnesses, and (4) unresolved. The database used also contains detailed descriptions of the warnings that are concretized as step-by-step witness explanation, including information on data values, assumptions made at the initial state, etc. As the human user investigates the warnings, the database also records information on whether a warning was deemed relevant or false, and any annotations provided by the user (such as interface constraints on the parameters of a function, etc.).

During perpetual program analysis, when a particular analysis instance is about to be repeated, the database is queried to receive a high-level understanding of the impact of the bound selection on prior analysis runs. With respect to the goal of the analysis, the bounds can be adaptively adjusted for the next analysis.

TABLE 1

Facts of Benchmarks

| Name | Version | ELOC | #Functions |
|---|---|---|---|
| thttpd | 2.25b | 6.7K | 1.45 |
| GenericNQS | 3.50.10-prel | 15.1K | 253 |
| Libupnp | 1.6.6 | 17.9K | 363 |
| Product A | — | 54.5K | 408 |
| Product B | — | 143.6K | 727 |

TABLE 2

Verification Results for Benchmarks with and without DC2

| | Success Ratio | | #Likely Bugs | |
|---|---|---|---|---|
| | w/o DC2 | w/DC2 | w/o DC2 | w/DC2 |
| Thttpd | 68% | 96% | 0 (0) | 5 (3) |
| GenericNQS | 82% | 94% | 6 (2) | 6 (2) |
| Libupnp | 81% | 98% | 8 (0) | 19 (8) |
| Product A | 89% | 96% | 8 (1) | 11 (6) |
| Product B | 88% | 91% | 14 (3) | 22 (9) |

For DC2 framework, we can utilize the obtained data as follows:

Adaptive Non-Monotonic Choice of Scope-Bounds:

If an earlier run failed to complete the analysis in the maximum allotted time for a vector of scope-bounds S, we can then reduce at least one component of the scope-bound vector S to improve scalability, such as reducing the depth of DC2 or the size of heap to model.

If an earlier run was able to complete quickly and did not report any witnesses, but reported tainted assume-safe checks, we can enlarge some scope to potentially find more program errors.

If many warnings of an earlier run were judged as false by user, we can automatically or manually identify relevant bounds in S to relax for the next analysis.

It is useful to note at this time that several approaches in the prior art have used scope bounding in an attempt to achieve better scalability in verification systems. More particularly, Taghdiri and Jackson [See, e.g., M. Taghdiri and D. Jackson, Inferring Specification to Detect Errors in Code, ASE, 14(1): 87-121, 2007] proposed a counterexample-guided refinement-based method to find bugs in Java programs. Their method iteratively increases the scope of called functions monotonically by utilizing information from counterexamples, and continues until it finds a proof or a witness that does not rely on any unconstrained value.

Additionally Babić and Hu proposed structural abstraction [See, e.g., D. Babić and A. J. Hu, Structural Abstraction of Software Verification Conditions, CAV 2007] that monotonically increases the boundary of verification by inserting function summaries on demand for a given property.

In sharp contrast, the methods employed by DC2 according to an aspect of the present disclosure advantageously works for all properties within a statically-determined scope. More specifically, instead of expanding the scope iteratively, it refines the pre-conditions and stubs for cut-off functions based on witness traces, and chooses the scope bounding vector non-monotonically based on stored results. In other words, the method according to the present disclosure proceeds non-monotonically in sharp contrast to the above noted methods.

Avoid Repeating the Same Analysis:

Even if an earlier run worked very well, we need to apply the analysis again if the software to analyze has been changed since an earlier run. Advantageously, we can utilize the database to avoid repeating the same analysis. Existing tools can provide the difference between two versions of software and a listing of modified functions (whose definitions have changed). Then, if a bounded scope for a function f in an earlier run contains any function in the modified function list, then the analysis will be applied to function f again. In addition, if the bounded scope contains any preconditions that have changed since the earlier run, then too f will be analyzed again. Otherwise, analysis off may be skipped.

EXPERIMENTS

For our experiments, we applied Varvel to five benchmarks, including two industry programs from NEC, with and without DC2. The description of the benchmarks is shown in Table 1. For simplicity, we employed only a part of each benchmark for the experiments. As shown in Table 1, the column ELOC3 shows the size of modules analyzed by Varvel. Product A is a developer tool whose original ELOC is 100 k and Product B is a business application software whose original ELOC is 1400 k.

For the experiments, the DC2 depth was set to 1, i.e., each scope consisted of two levels of function calls in the call graph, and we did not manually change any preconditions or stubs generated automatically by SpecTackle. We conducted preliminary experiments using libupnp by changing the DC2 depth.

We found that a depth cutoff of 1 found more bugs that a depth cutoff of 0. However, depth cutoff of 2 or 3 resulted in fewer successes, i.e. the models were too large for more functions. Note that the DC2 framework allows us to find a sweet-spot for scope bounding that may be different for different examples. We use techniques to make DC2 adaptive based on prior runs in a perpetual verification environment. As for the other configurations, time bound was set to 800 s for each function, the bound of recursive field access was set to 2, and the recursive unrolling depth was set to 1. The results are shown in Table 2. Success ratio shows the ratio of functions that were successfully verified within the time bound. Likely bugs shows the number of witnesses that we manually inspected, and believed to be worth reporting to the developers.

As expected, for all benchmarks, we observed that the success ratio improved with DC2. Clearly, scope bounding enabled application of Varvel on even those functions that had large call graphs. Further, we see that the number of detected bugs is also increased with DC2. Interestingly, many of the bugs found without DC2 were shallow, like dereferencing of a return value of malloc without checking its failure in the following statement:

x=malloc( . . . );
*x= . . . ;

On the other hand, Varvel was able to find deep, interesting bugs with DC2. The number of inter-procedural bugs is reported in parentheses in Table 2, where an inter-procedural bug means a bug that spans multiple functions.

FIG. 2 shows an interesting inter-procedural bug in libupnp (that was unknown), which was found only with DC2. More particularly, root_path is supposed to be initialized by config_description_doc at L1. If the initialization fails, it is designed to jump to an error handler at L2.

However, Varvel found a case where the initialization fails and the returned error code is UPNP_E_SUCCESS. The witness generated by Varvel indicates that if IXML_SUCCESS is assigned to err_code at L4 and ixmlDocument_createTextNode returns NULL then the execution proceeds to the error handler without changing err_code.

Note that IXML_SUCCESS and UPNP_E_SUCCESS have the same value of 0. Thus, uninitialized root_path will be given to calc_alias which asserts the non-nullness of the corresponding parameter.

Note that this is a bug even if we do not know the definitions of ixmlNode_appendChild and ixmlDocument_createTextNode and those functions were actually out of scope of the verification due to the DC2 depth. We investigated the reasons for missing some deep bugs without DC2. We found that, in many cases, Varvel failed to finish static analysis or the SAT-based BMC failed to find witnesses within the allotted time. In such cases, the application of DC2 is very helpful, since it reduces the model size and the number of instrumented properties.

Without DC2, the models tend to be large and contain many properties. This makes it difficult to simplify the model using static analysis, and BMC needs to verify a large number of properties in a limited time. Thus, DC2 provided an effective solution to verify given source code within a reasonable time.

Figure 3:
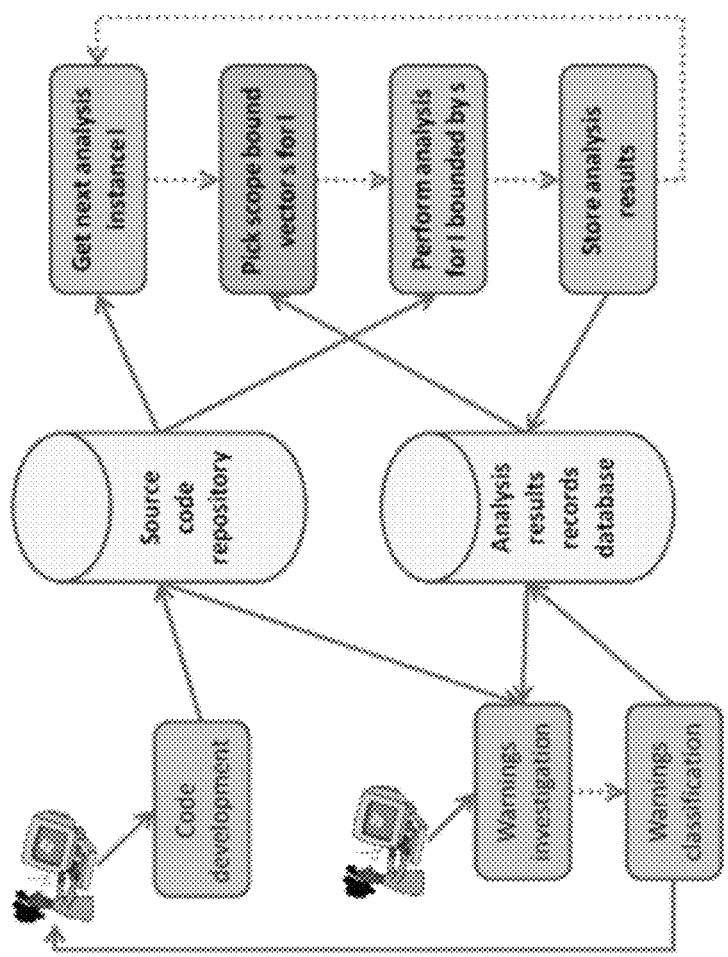
FIG. 3 shows a schematic of a program analysis framework according to an aspect of the present disclosure.

Turning now to FIG. 3, there is shown a schematic diagram depicting an overall framework for performing analysis according to an aspect of the present disclosure. As shown in this FIG. 3, a software program under development is produced in the code development block and placed into a source code repository. Analysis are performed on this code—which may be frequently updated from the code developers—and an analysis is performed. A separate database of analysis results is maintained which receives investigation inputs from users—which in turn may affect the source code in the repository as well as affecting the analysis parameters employed.

As may be appreciated, by having a human user investigating warnings and classifying them as relevant or false, our framework and method provides additional information useful to adapt the scope bounds dynamically over time thereby improving performance and precision further affecting the number and accuracy of bugs reported by the analysis.

One of the scope bounding techniques in our approach according to an aspect of the present disclosure involves a limit on the number of functions whose bodies are modeled precisely. Function calls to other functions are replaced by a function summary that is tainted assume safe. To improve the number of relevant warnings found using this approach, we supplement the scope-bounding procedure with a global and scalable automatic specification inference tool, which we have called SpecTackle. SpecTackle produces certain patterns of common and simply likely pre and post-conditions for functions in a scalable fashion. The scalability of SpecTackle is largely due to the fact that inter-procedural pointer analysis is avoided, which may produce false pre- and post-conditions. However, we only require the specifications generated by SpecTackle to be likely true, since pre- and post-conditions at call sites of functions are checked by the verification We have presented a framework called DC2 that combines scope bounding and automated specification inference to achieve better scalability and, at the same time, enhance the bug-finding ability of a software model checker. Our experimental results for DC2 in Varvel are encouraging, and support our belief that a bit-precise software model checker can accommodate the requirements from industry by carefully designing and engineering its application.

Figure 5:
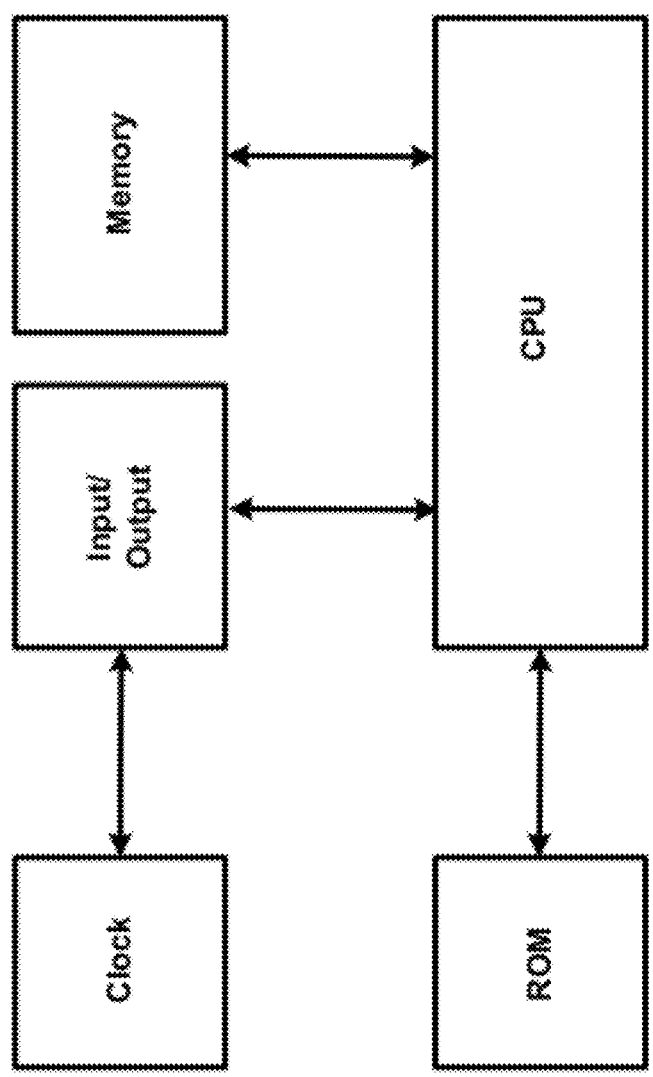
FIG. 5 is a schematic block diagram depicting a representative computer system with which the method and structures according to the present disclosure may be implemented.

Those skilled in the art will recognize that our description provided herein is merely exemplary and additional variations to our teachings are possible and contemplated. For example, the methods and structures described and used according to the present disclosure may be conveniently implemented on a contemporary computer system such as that shown schematically in FIG. 5. As a further example, an adaptive DC2 framework to tune the scope-bounding for given software, based on program metrics and prior verification runs are within the scope of our teachings which should only be limited by the claims appended hereto.

The invention claimed is:

1. A computer implemented method for adaptive, scope bounded verification of computer software programs comprising:
    a) performing an automated pattern-based specification inference on a whole computer software program to compute likely function pre-conditions and function post-conditions;
    b) generating multiple analysis instances from the whole computer software program by selecting functions to be treated as entry points for an analysis;
    c) choosing a scope bound vector for an instance using previous results stored in an analysis results records database;
    d) performing the analysis for a bounded instance;
    e) storing analysis results in the analysis results records database; and
    f) periodically performing the above steps a-e;
    wherein the scope bound vector is adaptively chosen non-monotonically after each iteration and wherein the analysis is performed such that the computed likely function pre-conditions and function post-conditions are weaved into the analysis instance at the function scope boundary.

2. The computer implemented method of claim 1 further comprising:
    generating operator-initiated warnings from the results stored in the analysis results records database and initiating investigations.

3. The computer implemented method of claim 2 further comprising:
    updating a source code repository with updated computer software program code such that a new analysis instance is generated.

4. The computer implemented method of claim 2, further comprising:
    modifying the function pre-conditions and post-conditions for the next iteration based on the analysis results and generated warnings.

5. The computer implemented method of claim 1, wherein the pattern-based specification inference is based on syntactically matching expressions in the code and handling pointer indirections.

6. The computer implemented method of claim 1, wherein the specification inference hoists annotations based on assertions inside a function to its start and across function calls.

7. The computer implemented method of claim 1, wherein the specification inference hoists annotations based on potential runtime errors inside a function to its start and across function calls.

8. The computer implemented method of claim 7, wherein the specification inference hoists annotations for potential runtime errors, including segmentation faults, buffer overflows, and memory leaks.

* * * * *